2 Sheets—Sheet 1.

I. T. EVANS.
Sectional Harrow.

No. 210,311. Patented Nov. 26, 1878.

Witnesses:
Frank W. Heers
Erastus W. Smith

Inventor:
Ira T. Evans,
By Thomas G. Orwig,
Attorney.

2 Sheets—Sheet 2.

I. T. EVANS.
Sectional Harrow.

No. 210,311. Patented Nov. 26, 1878.

Witnesses:
Frank W. Heers
Erastus W. Smith

Inventor:
Ira T. Evans,
By Thomas G. Orwig,
Attorney.

UNITED STATES PATENT OFFICE.

IRA T. EVANS, OF DES MOINES, IOWA.

IMPROVEMENT IN SECTIONAL HARROWS.

Specification forming part of Letters Patent No. 210,311, dated November 26, 1878; application filed June 11, 1878.

*To all whom it may concern:*

Be it known that I, IRA T. EVANS, of Des Moines, in the county of Polk and State of Iowa, have invented an Improved Sectional Harrow, of which the following is a specification:

The object of my invention is to save time and labor in cleaning and preparing plowed ground for seed, and in cultivating corn and other field crops.

Heretofore triangular-shaped sections have been formed and combined with an evener in various ways, so as to produce a flexible harrow that would conform to any uneven surface over which the harrow is dragged.

The novelty of my invention consists, first, in the combination and arrangement of an inclined tooth or fender, fixed at the center and front of an A-form harrow-section, with two series of teeth in the angling side bars, so as to turn aside obstructions from the series of operating-teeth; second, in the manner of preventing the contiguous rear ends of the sections from overlapping by means of heel-plates; third, in the manner of combining three sections and the evener by means of adjustable chains of uniform length that will allow restricted independent motions to each section, as required, to stir the soil, to part rubbish into rows, and to keep the teeth from clogging, all as hereinafter fully set forth.

Figure 1:
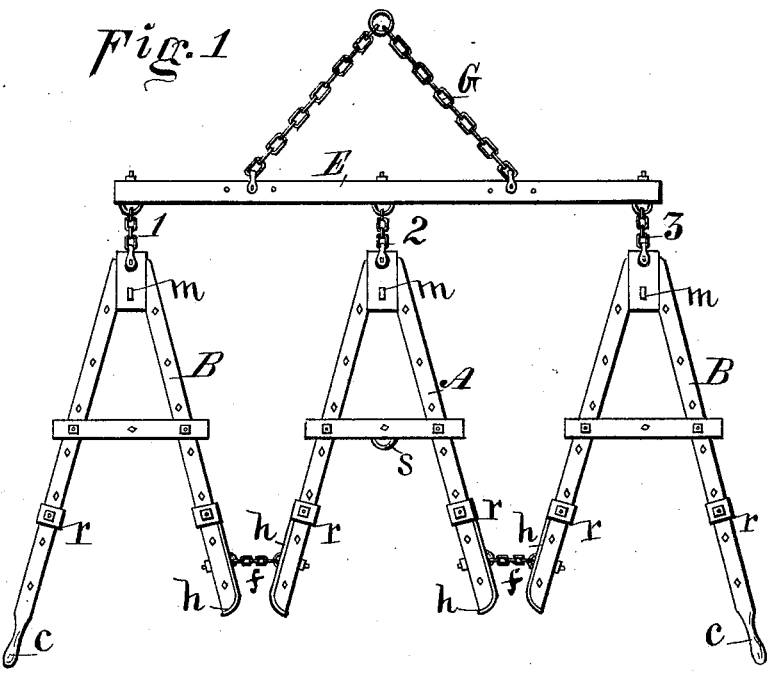
Figure 2:
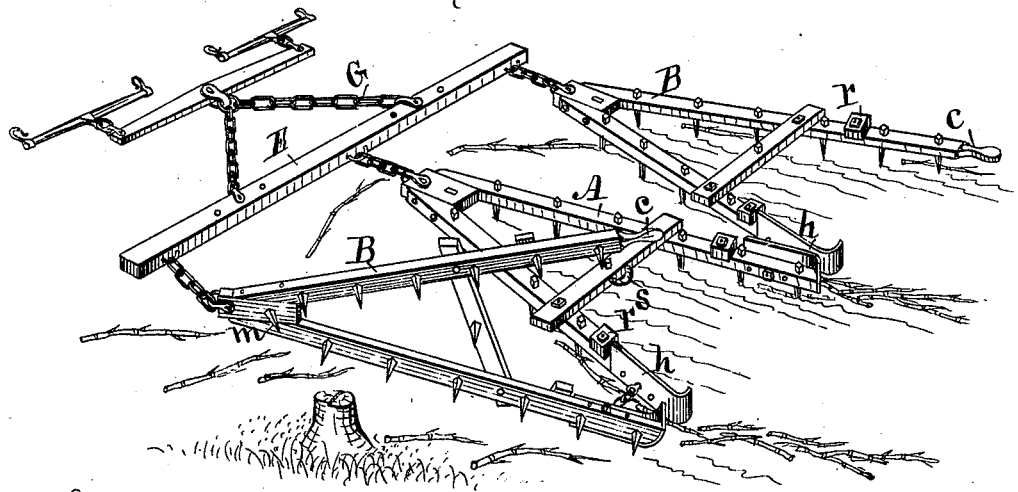
Figure 3:
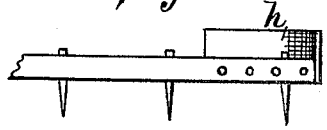

Figure 1 of my drawing is a plan view of my harrow. Fig. 2 is a perspective view, showing one section turned up. Figs. 3, 4, 5, and 6 are sectional views, showing parts in detail.

Similar letters of reference are used in each figure to denote like parts, and all of the figures, considered together, clearly illustrate the construction and operation of my complete invention.

A is a triangular-shaped harrow-section. B B are sections of corresponding form and size, placed on opposite sides of the central section A. Each one of the sections B has a handle, c, at the rear end of its outside tooth-bearing bar.

E is an evener or drag-bar, to which the three sections A B B are coupled at uniform distances apart by means of clevises and chains 1 2 3. The rear ends of the sections are flexibly connected by means of adjustable chains $f f$, that are uniform in length, with the chains 1 2 3 at their front ends.

G is an adjustable drag-chain, coupled to the drag-bar E by means of adjustable clevises.

The harrow-sections and the drag-bar are preferably made of hard wood, and of such size that the complete harrow will cover an area of about twelve feet wide as it advances over a field.

$h\ h\ h\ h$ are plates fixed against the sides and heel ends of the inside teeth-bearing bars of the sections B B and both of the bars of the central section, A. These heel-plates $h$ are wider than the bars, to which they are fixed by means of bolts or in any suitable way, and extend upward sufficiently to prevent any two contiguous heel ends of the harrow-sections from overlapping when not in horizontal line with each other, as frequently occurs when one section is elevated by the operator or by some obstruction. The position of the heel-plate $h$ relative to the rear end of the teeth-bearing bar is clearly shown by Fig. 3, and the utility thereof, in combination with the connecting-chains $f f$, to prevent the overlapping of the harrow-sections when one section is elevated, is illustrated in Fig. 4.

The heel ends of the teeth-bearing bars, connected by means of chains $f$, have each a series of perforations, in which the ends of the chains can be adjusted to diminish or increase the vibratory motions of the harrow-sections, as required for various reasons hereinafter set forth.

Figure 4:
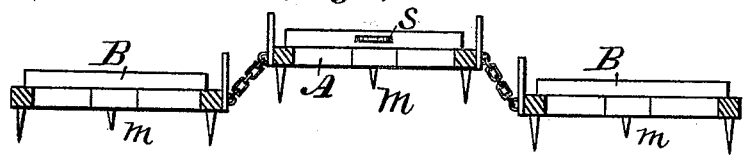
Figure 6:
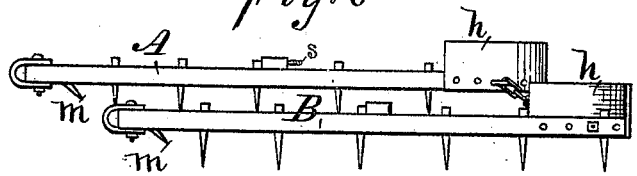

By attaching one end of a chain, $f$, in a forward position on the perforated bar and the other end backward on the contiguous bar, the vibration of the sections is diminished, and the central section, A, can still be raised by the operator, as shown by Figs. 4 and 6.

$m$ is a short tooth in the front and center of each section. It is inclined rearward, and serves to engage clods of dirt, corn-stalks, or other obstructions, and push them aside to pass along on one side of the diverging lines of teeth, to be gathered in rows outside of each section.

Weights $r$ can be fixed on the rear portions of the teeth-bearing bars, as shown, to press the teeth into the soil, whenever required.

In the practical operation of my improved harrow, when horses are attached to the adjustable drag-chain G by means of a doubletree, the chain can be readily lengthened and shortened by bringing the clevises closer together or farther apart on the evener E. When the chain is lengthened the harrow-sections are inclined to press uniformly upon the ground, and when the chain is shortened the front ends will be slightly elevated and the rear ends depressed. When the connecting-chains $f f$ are attached, as shown in Fig. 1, the front ends of the sections will have independent vibratory motion, and each tooth will advance in zigzag line, while the heel ends of the contiguous bars will be in contact and mutually act as pivotal rests, upon which the forward portions of the harrow-sections hinge and sway laterally.

When the harrow is thus adjusted it is admirably adapted for cultivating corn when the plants are small and liable to be covered with clods, loose soil, corn-stalks, or other obstructions that can be moved by the harrow-teeth.

By dragging the complete harrow over three rows of plants in such a manner that the point of each section having a short tooth, $m$, will be immediately over the plants, those short teeth will turn aside the clods and obstructions away from the plants, and the forward operating-teeth of the diverging rows of each vibrating front end of a section will make zigzag tracks in the soil and stir all around and between the plants without tearing them and without covering them, while at the same time many weeds growing close to the corn will be destroyed, and the clods, old corn-stalks, and other loose obstructions on the surface will be gathered into rows midway between the rows of plants.

By using the harrow in the same way for preparing old corn-fields, for seeding them with wheat, or any other crop, the soil can be well loosened and pulverized, and the old stalks and other loose obstructions gathered into rows about four feet apart, where they can remain to decay and crumble, or from whence they can be readily gathered into heaps to be destroyed or removed.

Figure 5:
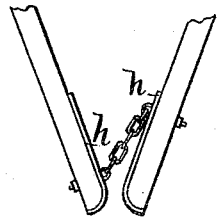

To use my sectional harrow for the common purposes of a drag-harrow, I adjust the connecting-chains $f$ as shown in Fig. 5, and lengthen the drag-chain G. In this position the chains $f$ will be kept stretched from the front to the rear, the three sections made to move like one, and the vibratory motion of the front ends of the sections will be prevented or diminished, if the chains are adjusted so as to allow some play. The clods, corn-stalks, and other obstructions will pass under the complete harrow in a common way, and when the teeth become clogged I can readily clean them by seizing the handle $c$ of the outside sections, B, and turning them inward to drop the gathered obstructions in heaps outside of the reach of the central section, A; and to clean the central section, I seize the handle $s$ on its cross-bar, and simply lift it upward and forward, as represented by Fig. 6. This action will cause the chains to jerk and jar the section, and thereby shake the gathered obstructions from its teeth, to drop in a heap midway between the sections B B.

My harrow is therefore well adapted for all the uses of a common drag-harrow, while at the same time it is specially adapted for cultivating corn, and for gathering obstructions into rows while the soil is being prepared for the reception of seed.

I claim—

1. In a triangular or A-form harrow, the short and inclined tooth $m$ in the front and center, in combination with the two series of straight teeth in the angling side bars, substantially as shown and described, to operate in the manner set forth.

2. The heel-plates $h$, in combination with the rear ends of the contiguous teeth-bearing bars of the sections A and B, substantially as and for the purposes shown and described.

3. The adjustable and flexible harrow composed of the sections A B B, each having heel-plates $h$ on their contiguous teeth-bearing bars, the evener E, the connecting-chains 1 2 3, and the adjustable connecting-chains $f f$, substantially as shown and described, to be operated in the various ways and for the various purposes set forth.

IRA T. EVANS.

Witnesses:
ERASTUS W. SMITH,
FRANK W. HEERS.